(12) United States Patent  
Shimada et al.

(10) Patent No.: US 8,145,449 B2
(45) Date of Patent: Mar. 27, 2012

(54) COMPUTER PRODUCT, APPARATUS, AND METHOD FOR SYSTEM MANAGEMENT

(75) Inventors: Kuniaki Shimada, Kawasaki (JP); Keiichi Oguro, Kawasaki (JP); Masazumi Matsubara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 210 days.

(21) Appl. No.: 12/359,898

(22) Filed: Jan. 26, 2009

(65) Prior Publication Data

US 2009/0132203 A1 May 21, 2009

Related U.S. Application Data (63) Continuation of application No. PCT/JP2006/314914, filed on Jul. 27, 2006.

(51) Int. Cl.
*G21C 17/00* (2006.01)

(52) U.S. Cl. ......... 702/184; 702/179; 702/183

(58) Field of Classification Search ......... 701/29, 701/30; 702/179, 183, 184; 709/202, 220
See application file for complete search history.

(56) References Cited

U.S. PATENT DOCUMENTS

| 6,701,727 | B2* | 3/2004 | Komatsu et al. ......... 62/148 |
| 6,766,209 | B2* | 7/2004 | Aiuchi et al. ......... 700/110 |
| 6,968,259 | B2* | 11/2005 | Simons et al. ......... 701/30 |
| 7,080,141 | B1* | 7/2006 | Baekelmans et al. ......... 709/224 |

FOREIGN PATENT DOCUMENTS

| JP | A 3-88032 | 4/1991 |
| JP | A 4-299740 | 10/1992 |
| JP | 06-149623 | 5/1994 |
| JP | 2001-034509 | 2/2001 |
| JP | A 2004-145536 | 5/2004 |
| JP | 2006-023910 | 1/2006 |

OTHER PUBLICATIONS

"An architectural blueprint for autonomic computing," 3rd Edition, Jun. 2005, U.S.A IBM Corporation: http://www-03.ibm.com/autonomic/pdfs/AC%20Blueprint%20White%20Paper%20V7.pdf.
Office Action issued by the Patent Office of Japan for related Japanese Application No. 2008-526649, mailed Nov. 8, 2011 (with copy of English language translation).

* cited by examiner

*Primary Examiner* — Eliseo Ramos Feliciano
*Assistant Examiner* — Elias Desta
(74) *Attorney, Agent, or Firm* — Greer, Burns & Crain, Ltd.

(57) ABSTRACT

A system management apparatus includes a countermeasure-result evaluating unit that evaluates whether a countermeasure taken by a countermeasure taking unit has been solved, and that stores the result of evaluation in a countermeasure database to reflect the result to a criterion for selecting the countermeasure by a countermeasure determining unit next time.

21 Claims, 8 Drawing Sheets

| ENTRY No. | DETERMINATION CONDITION | SYMPTOM NAME | COUNTER-MEASURE COUNT | SOLUTION COUNT | DATE AND TIME OF SOLUTION |
|---|---|---|---|---|---|
| A001 | CPU TEMPERATURE> 80 °C | HIGH TEMPERATURE | 17 | 17 | 2006/4/13 8:51 |
| A002 | CPU UTILIZATION>70 % PROCESS COUNT>200 | EXCESSIVE PROCESSES | 52 | 39 | 2006/5/25 15:33 |
| A003 | CPU UTILIZATION>70 % MEMORY UTILIZATION>80 % | HIGH BURDEN | 45 | 36 | 2006/5/1 19:28 |
| ... | ... | ... | ... | ... | ... |

FIG.4

| SYMPTOM NAME | COUNTERMEASURE | EFFICEINCY | SIDE EFFECT | COUNTER-MEASURE COUNT | SOLUTION COUNT | DATE AND TIME OF SOLUTION |
|---|---|---|---|---|---|---|
| HIGH TEMPERATURE | LOWER CLOCK FREQUENCY | 10 | 0 | 17 | 17 | 2006/4/13 8:51 |
| EXCESSIVE PROCESSES | ADD SERVER | 8 | -3 | 3 | 2 | 2006/2/17 4:47 |
| | LIMIT TRANSACTION | 9 | -1 | 49 | 37 | 2006/5/25 15:33 |
| HIGH BURDEN | ADD SERVER | 8 | -3 | 26 | 23 | 2006/5/1 19:28 |
| | LIMIT TRANSACTION | 7 | -1 | 19 | 13 | 2006/4/22 21:43 |
| ... | ... | ... | ... | ... | ... | ... |

FIG.5

| EVENT ID | SERVER NAME | PHENOMENON |
|---|---|---|
| evt0001 | SERVER A | CPU UTILIZATION: 83 % |

COMPUTER PRODUCT, APPARATUS, AND METHOD FOR SYSTEM MANAGEMENT

CROSS-REFERENCE TO RELATED APPLICATIONS

This application is a continuation of PCT international application Ser. No. PCT/JP2006/314914, filed on Jul. 27, 2006 which designates the United States, the entire contents of which are incorporated herein by reference.

BACKGROUND

1. Field

The present invention relates to a system management technology for identifying a symptom of a problem in an object to manage and determine a countermeasure against the symptom.

2. Description of the Related Art

If a problem occurs in an information processing system, a countermeasure has been taken based on know-how owned by a person in charge, such as a system administrator.

The know-how is accumulated by each person in charge based on his/her experience of coping with individual problems, and usually not shared sufficiently. Therefore, there can be a large difference in the level of coping with the problems among the persons in charge.

To eliminate such dependence on the personal skills and increase speed and quality of the countermeasures to be taken, there has been proposed technologies of storing stylized know-how related to various problems that can occur to the information system in a database and using the database to identify the symptom and determine the countermeasure to be taken against the identified symptom.

For example, Japanese Laid-open Patent Publication No. 2004-145536 discloses a conventional technology of automatically detecting a performance degradation of a network system, finding the cause, and notifying the system administrator of the countermeasure. Further, there has been disclosed another conventional technology of autonomously solving a problem by an autonomic manager referring to the database for solving the problem when the problem occurs. Reference may be had to "An architectural blueprint for autonomic computing", [online], IBM Corporation, searched on June 30, 2006.

The above conventional technologies postulate that the know-how related to determination of the countermeasure is sufficiently examined before storing it in the database to appropriately determine the countermeasure to solve the symptom of the device having the problem.

Therefore, if the know-how is stored in the database without being fully examined or if the stored know-how becomes outdated due to change of an environment or the like, an inappropriate countermeasure is selected more often, thereby drastically reducing the reliability of the system.

SUMMARY

It is an object of the present invention to at least partially solve the problems in the conventional technology.

According to an aspect of an embodiment, a system management apparatus that identifies a symptom of a problem occurring in a managed device, determines a countermeasure to solve the symptom, and takes the countermeasure, includes: an information obtaining unit that obtains information indicative of a state of the managed device; a symptom identifying unit that identifies the symptom of the managed device by checking the information obtained by the information obtaining unit against a symptom database, which includes the state of the managed device and the symptom of the managed device specified by the state associated with each other; a countermeasure determining unit that determines the countermeasure to solve the symptom of the managed device by checking the symptom identified by the symptom identifying unit against a countermeasure database, which includes information related to determination of the countermeasure with respect to each symptom; a countermeasure taking unit that takes the countermeasure determined by the countermeasure determining unit; and a countermeasure-result evaluating unit that evaluates whether the countermeasure taken by the countermeasure taking unit has solved the symptom, and updates the countermeasure database based on an evaluation result.

According to another aspect of an embodiment, a system management method for identifying a symptom of a problem occurring in a managed device, determining a countermeasure to solve the symptom, and taking the countermeasure, includes: obtaining information indicative of a state of the managed device; identifying the symptom of the managed device by checking the information obtained the obtaining against a symptom database, which includes the state of the managed device and the symptom of the managed device specified by the state associated with each other; determining the countermeasure to solve the symptom of the managed device by checking the symptom identified by the identifying against a countermeasure database, which includes information related to determination of the countermeasure with respect to each symptom; taking the countermeasure determined by the determining; and evaluating whether the countermeasure taken at the taking has solved the symptom, and updating the countermeasure database based on an evaluation result.

According to still another aspect of the embodiment, a computer-readable recording medium implements the above method on a computer.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE PREFERRED EMBODIMENTS

Exemplary embodiments of the present invention are described in detail below with reference to the accompanying drawings.

Figure 1:
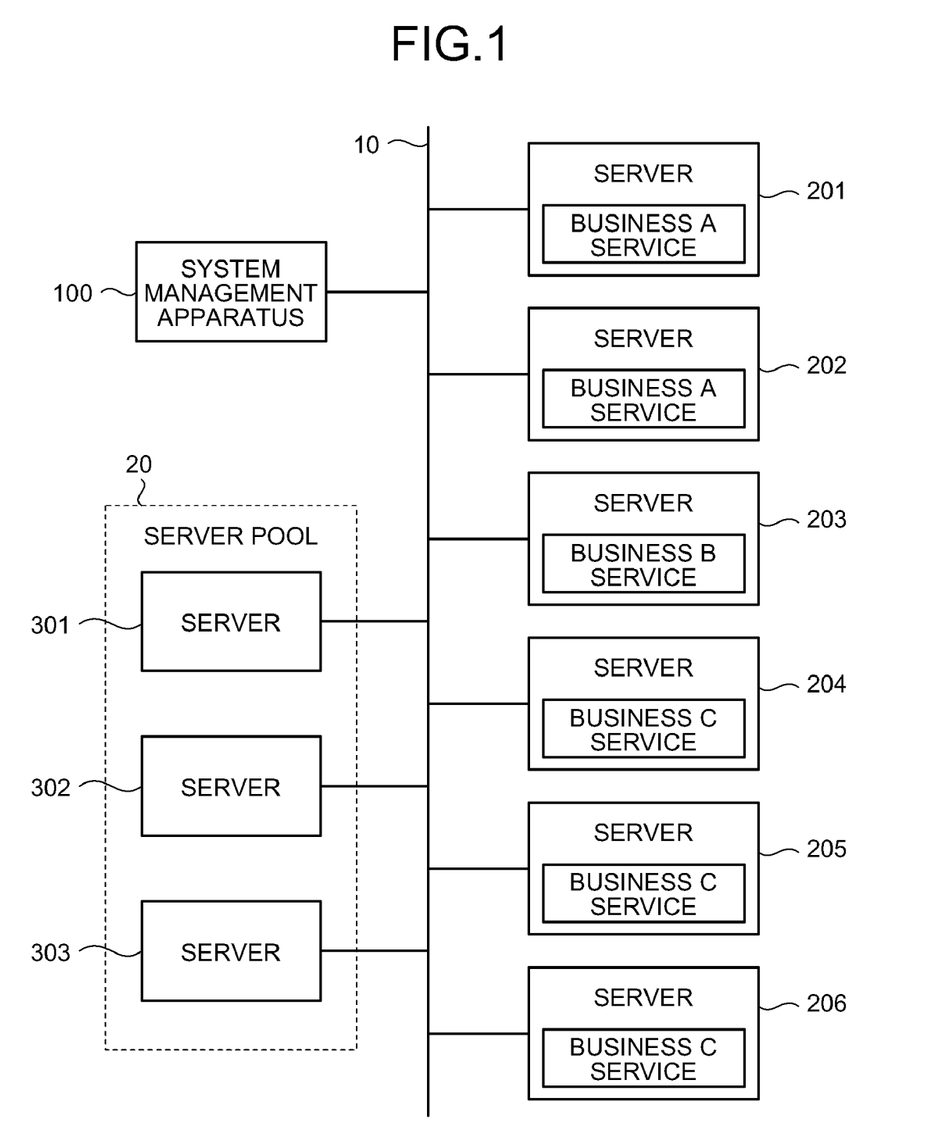
FIG. 1 is a schematic diagram of an example of an information processing system to which is applied a system management method according to an embodiment of the present invention.

Described below is an example of an information processing system to which is applied a system management method according to an embodiment. FIG. 1 is a schematic diagram of an example of the information processing system to which is applied the system management method according to the embodiment.

The information processing system illustrated in FIG. 1 includes a system management apparatus 100, servers 201 to 206, and servers 301 to 303, connected to one another with a network 10 such as a LAN (Local Area Network).

The system management apparatus 100 performs the system management method according to the embodiment. The system management apparatus 100 monitors the servers 201 to 206 and the servers 301 to 303, and, if a problem occurs in the servers or a service executed by the servers, the system management apparatus 100 autonomously performs a series of processes of referring to a database included therein, identifying a symptom of the problem, determining a countermeasure against the identified symptom, and taking the countermeasure.

The servers 201 to 206 execute a predetermined service assigned to each of them. In this example, the servers 201 and 202 execute a business A service, the server 203 executes a business B service, and the servers 204 to 206 execute a business C service.

The servers 301 to 303 are not assigned a specific service, and belong to a server pool 20. The server pool means a group of servers that do not have a specific application and that can be used as desired.

If the system management apparatus 100 determines that some problem occurs in any one of the servers 201 to 206 and that the service assigned to the server needs to be executed by another server, the system management apparatus 100 has one of the servers belonging to the server pool 20 execute the service.

To have the servers 301 to 303, of which the application is not specified, execute a specified service, for example, grid technology can be used. Because the grid technology is publicly known, an explanation thereof is omitted.

Although a group of servers that execute various business services are managed by the system management method according to the embodiment in the above example, the system management method according to the embodiment can also manage various devices such as a client terminal and a communication controlling device.

Figure 2:
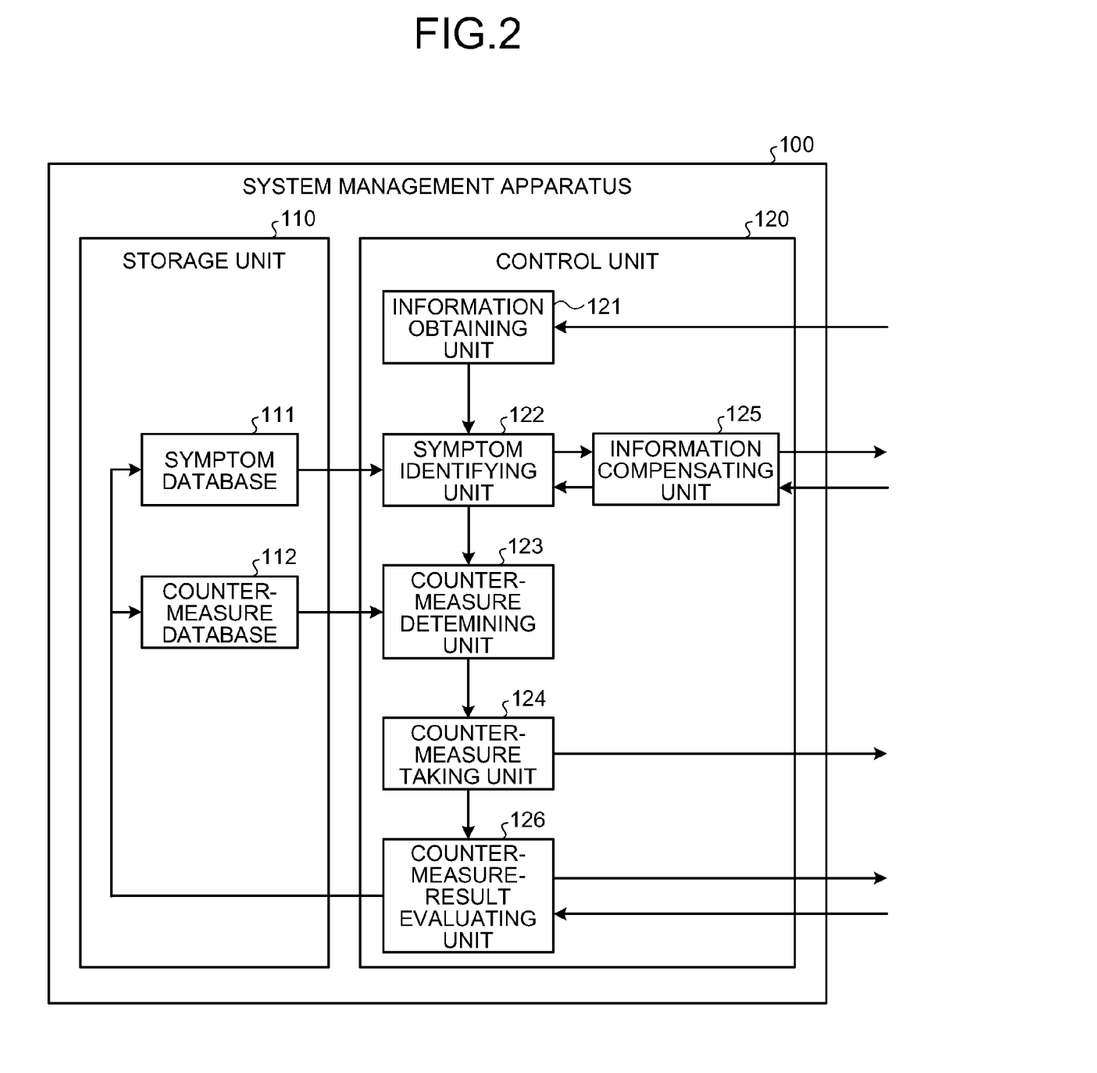
FIG. 2 is a block diagram of the system management apparatus illustrated in FIG. 1.

A configuration of the system management apparatus according to the embodiment is explained below. FIG. 2 is a block diagram of the system management apparatus 100 illustrated in FIG. 1. As illustrated in FIG. 2, the system management apparatus 100 includes a storage unit 110 and a control unit 120.

The storage unit 110 stores therein various types of information, and includes a symptom database 111 and a countermeasure database 112. The symptom database 111 includes information used to identify the symptom of the problem that occurs in the managed device. An example of the symptom database 111 is illustrated in FIG. 3.

Figure 3:
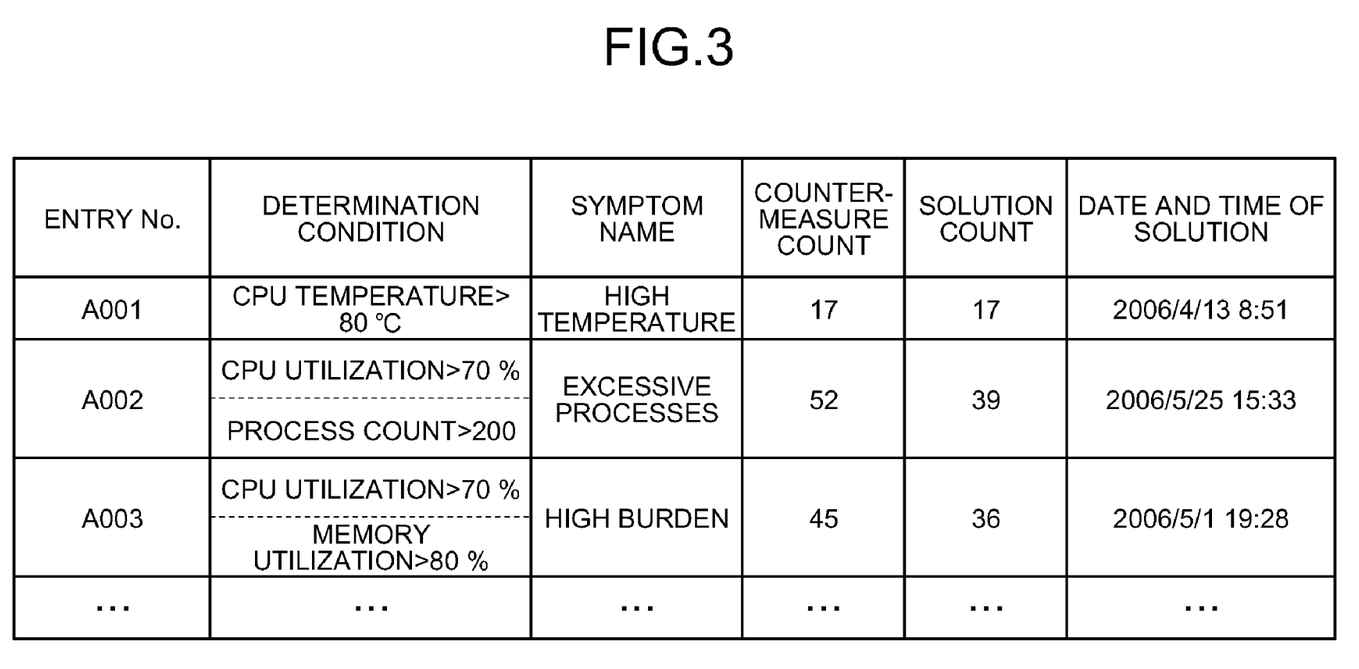
FIG. 3 is a schematic diagram of an example of a symptom database.

As illustrated in FIG. 3, the symptom database 111 includes items such as entry number, determination condition, symptom name, countermeasure count, solution count, and date and time of solution. The entry number is an identification number for identifying the entry. The determination condition is a condition for identifying the symptom, and the symptom database 111 is configured so that a plurality of conditions can be set to a single entry. The symptom name is a name of the symptom identified by the determination condition of the entry.

The countermeasure count indicates the number of times of taking some countermeasure against the symptom identified by the entry, and the solution count indicates the number of times that the symptom has been solved by the countermeasure. The date and time of solution indicates the date and time at which the symptom was solved by taking the countermeasure against the symptom identified by the entry for the last time.

For example, an entry identified by an entry number "A001" indicates that, when temperature of a CPU (Central Processing Unit) to be managed exceeds 80° C., a symptom identified by the name of "high temperature" occurs in the CPU. The entry also indicates that the countermeasure has been taken against the symptom 17 times, that the symptom has been solved 17 times, and that the symptom was last solved at 8:51 Apr. 13, 2006.

An entry identified by an entry number "A002" indicates that, when the utilization of the CPU to be managed exceeds 79% and the number of the processes exceeds 200, a symptom identified by the name of "excessive processes" occurs in the CPU. The entry also indicates that the countermeasure has been taken against the symptom 52 times, that the symptom has been solved 39 times, and that the symptom was last solved at 15:33 May 25, 2006.

An entry identified by an entry number "A003" indicates that, when the utilization of the CPU to be managed exceeds 79% and the utilization of a memory exceeds 80%, a symptom identified by the name of "high burden" occurs in the CPU. The entry also indicates that the countermeasure has been taken against the symptom 45 times, that the symptom has been solved 36 times, and that the symptom was last solved at 19:28 May 1, 2006.

If there is a plurality of patterns of the determination conditions to identify an identical symptom, the determination conditions can be stored by different entries with respect to each determination patterns. In this case, an identical symptom name is set to a plurality of entries.

Figure 4:
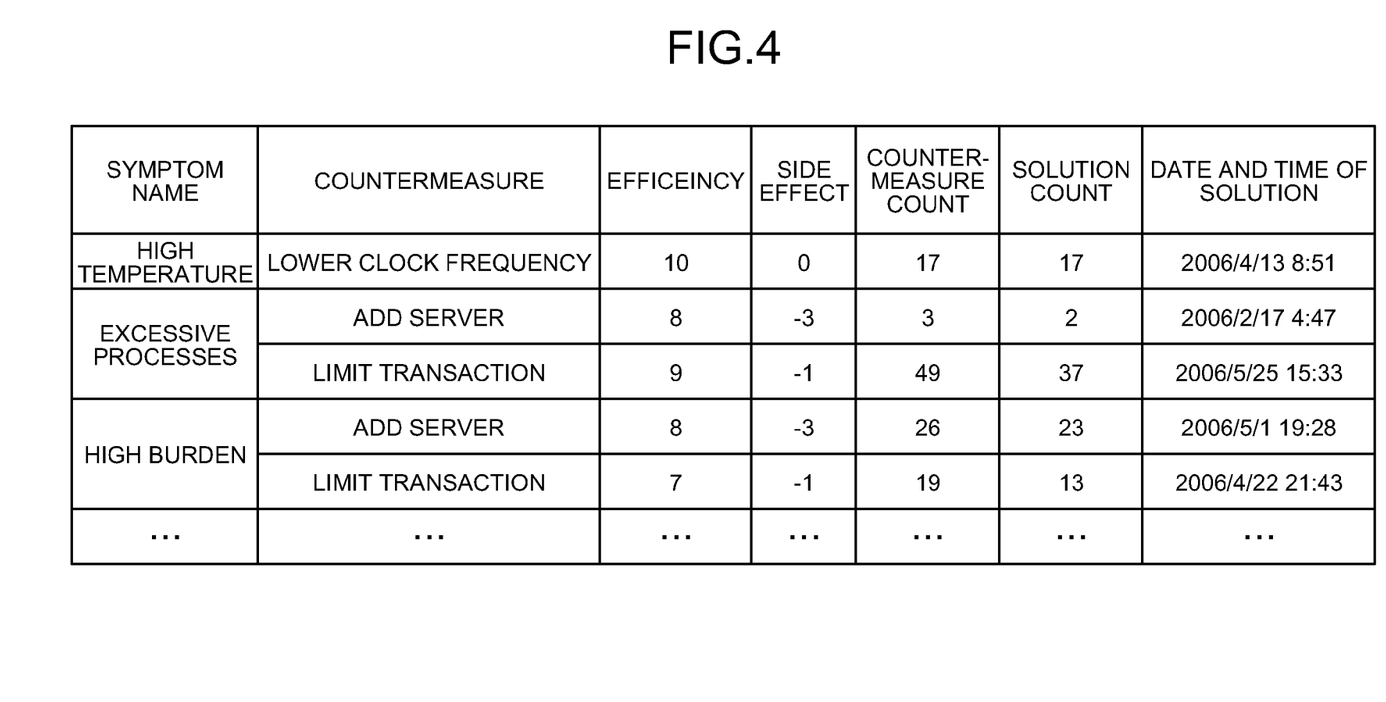
FIG. 4 is a schematic diagram of an example of a countermeasure database.

The countermeasure database 112 includes countermeasures to solve the identified symptoms and rules of selecting each of the countermeasures. An example of the countermeasure database 112 is illustrated in FIG. 4. As illustrated in FIG. 4, the countermeasure database 112 includes items such as symptom name, countermeasure, efficiency, side effect, countermeasure count, solution count, and date and time of solution, and a plurality of combinations of the items from the countermeasure to the date and time of solution can be set to a single symptom name.

The symptom name is an identification name indicative of the symptom that occurs in the managed device, and corresponds to the symptom name in the symptom database 111. The countermeasure indicates a countermeasure that can be taken to solve the symptom and normalize the managed device. The efficiency indicates the level of efficiency of the countermeasure, and the side effect indicates the degree of an effect secondarily caused by the countermeasure. The effect secondarily caused means an effect on a device or a service that does not suffer the problem, when the countermeasure is taken.

When the side effect indicates a positive value, it means that a favorable effect is secondarily caused by the countermeasure, and when the side effect indicates a negative value, it means that an unfavorable effect is secondarily caused by the countermeasure. By storing the degree of the effect directly obtained by the countermeasure as the efficiency and storing the degree of the secondarily caused effect individually as the side effect, a purpose of evaluating the countermeasure is made clear and an erroneous evaluation hardly occurs when the evaluation of the countermeasure is reviewed.

The countermeasure count indicates the number of times of taking the countermeasure, and the solution count indicates the number of times that the symptom has been solved by the countermeasure. The date and time of solution indicates the date and time at which the symptom was solved by the countermeasure for the last time.

The first entry in FIG. 4 indicates that a symptom is identified by the name "high temperature", that a countermeasure called "lower clock frequency" can be taken against the symptom, that the efficiency of the countermeasure is "10", and that the side effect of the countermeasure is "0". The entry also indicates that the countermeasure has been taken 17 times, that the symptom has been solved 17 times, and that the symptom was last solved at 8:51 Apr. 13, 2006.

The second entry in FIG. 4 indicates that a symptom is identified by the name "excessive processes", and that countermeasures called "add server" and "limit transaction" can be taken against the symptom. The entry also indicates that the efficiency, the side effect, the countermeasure count, the solution count, and the date and time of solution of the countermeasure "add server" are respectively "8", "−3", "3", "2", and "2006/2/17 4:47", and that the efficiency, the side effect, the countermeasure count, the solution count, and the date and time of solution of the countermeasure "limit transaction" are respectively "9", "−1", "49", "37", and "2006/5/25 15:33".

The third entry in FIG. 4 indicates that a symptom is identified by the name "high burden", and that countermeasures called "add server" and "limit transaction" can be taken against the symptom. The entry also indicates that the efficiency, the side effect, the countermeasure count, the solution count, and the date and time of solution of the countermeasure "add server" are respectively "8", "−3", "26", "23", and "2006/5/1 19:28" and that the efficiency, the side effect, the countermeasure count, the solution count, and the date and time of solution of the countermeasure "limit transaction" are respectively "7", "−1", "19", "13", and "2006/4/22 21:43".

Although the symptom database 111 and the countermeasure database 112 are independent from each other in the configuration illustrated in FIG. 2, the two databases can be integrated to form a single database.

The control unit 120 controls the whole system management apparatus 100, and includes an information obtaining unit 121, a symptom identifying unit 122, a countermeasure determining unit 123, a countermeasure taking unit 124, an information compensating unit 125, and a countermeasure-result evaluating unit 126. The information obtaining unit 121 obtains information about the state of the managed device by receiving a notify event from the managed device.

Figure 5:
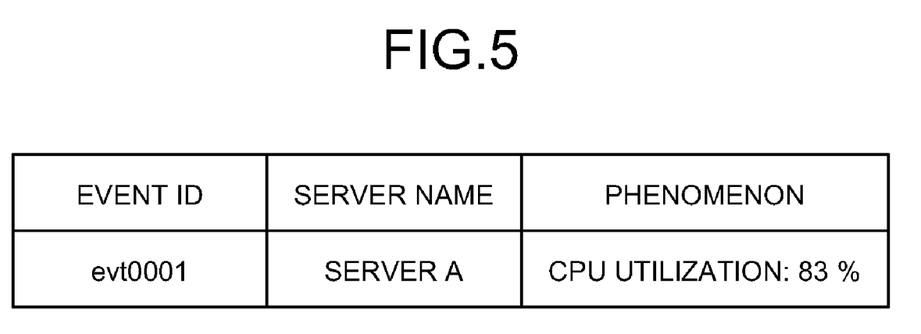
FIG. 5 is a schematic diagram of an example of a notify event.

An example of a notify event sent from the managed device is illustrated in FIG. 5. As illustrated in FIG. 5, the notify event includes items such as event ID, server name, and phenomenon. The event ID is an identification number for identifying the notify event. The server name is a host name of a server that sent the notify event. The phenomenon indicates a specific state of the server that sent the notify event.

The notify event can be sent from the managed device to the system management apparatus 100 when a particular phenomenon occurs in the managed device to inform of the phenomenon, or regularly to inform on a predetermined phenomenon. The information obtaining unit 121 can be configured to actively collect information by inquiring the managed device about the state, or the information obtaining unit 121 can be configured so that a system administrator inputs information equivalent to the notify event to the information obtaining unit 121 via an input device such as a keyboard.

The symptom identifying unit 122 identifies the symptom of the managed device by checking the information about the state of the managed device obtained by the information obtaining unit 121 against the symptom database 111. As explained above, the symptom database 111 is configured so that the symptom can be identified by a combination of a plurality of the determination conditions, and sometimes it is hard to determine whether a part of the combination of the determination conditions is satisfied only by the information included in the notify event.

Therefore, when it is hard to determine whether a part of the combination of the determination conditions is satisfied, the symptom identifying unit 122 requests the information compensating unit 125 to compensate for missing information.

In this manner, in the system management method according to the embodiment, unlike an event-driven type of a simple problem-solving model, because the information compensating unit 125 actively obtains missing information as needed, even if the information obtaining unit 121 obtains a small amount of information, the actual symptom can be correctly narrowed down. Furthermore, because the symptom is identified using the least information, collection of the information does not generate a large burden even if the managed devices are increased.

If the information obtained by the information obtaining unit 121 matches determination conditions of a plurality of entries in the symptom database 111, the symptom identifying unit 122 calculates a solving rate of each entry, and determines that the symptom of an entry with the highest solving rate occurred. The solving rate of each entry is calculated by using, for example, the following Equation 1.

[Equation 1]

$$\text{solving rate} = (\text{solution count} + 1)/(\text{countermeasure count} + 1) \quad (1)$$

One is added to both the solution count and the countermeasure count so that a comparison with other entries can be appropriately performed even when either one or both of the solution count and the countermeasure count is zero.

The countermeasure determining unit 123 determines a countermeasure to solve the symptom of the managed device by checking the symptom identified by the symptom identifying unit 122 against the countermeasure database 112.

If a plurality of countermeasures against the symptom identified by the symptom identifying unit 122 is stored in the countermeasure database 112, the countermeasure determining unit 123 calculates a priority of each countermeasure, and employs the countermeasure with the highest priority. The priority of each countermeasure is calculated by using, for example, the following Equation 2.

[Equation 2]

$$\text{priority} = \text{efficiency} \times \text{solving rate} + \text{side effect} \quad (2)$$

The solving rate is calculated by assigning the countermeasure count and the solution count corresponding to the countermeasure to Equation 1, and it indicates the rate of solving the symptom by taking the countermeasure.

In this manner, by multiplying the efficiency by the solving rate, the priority is appropriately corrected even if the set value of the efficiency is not appropriate or it is outdated due to change of an environment or the like. This is because the solving rate lowers and the priority lowers unless the countermeasure is taken and the symptom is solved several times, even if the efficiency of the countermeasure is set inappropriately high.

The countermeasure taking unit 124 takes the countermeasure determined by the countermeasure determining unit 123. The information compensating unit 125 actively obtains the information about the state of the managed device by inquiring the managed device for the information for which the symptom identifying unit 122 requested to compensate.

The countermeasure-result evaluating unit 126 reflects the result of the countermeasure taken by the countermeasure taking unit 124 in the countermeasure database 112. Specifically, the countermeasure-result evaluating unit 126 adds one to the countermeasure count of the countermeasure that is taken, adds one to the solution count as well if the symptom is solved by taking the countermeasure, and updates the date and time of solution to the present time and date.

The countermeasure-result evaluating unit 126 also reflects the countermeasure taken by the countermeasure taking unit 124 in the symptom database 111. Specifically, the countermeasure-result evaluating unit 126 adds one to the number of times of measure of the entry based on which the countermeasure is selected, adds one to the solution count as well if the symptom is solved by taking the measure, and updates the date and time of solution to the present time and date.

Whether the symptom is solved by taking the countermeasure taken by the countermeasure taking unit 124 can be determined by verifying whether the determination conditions of the entry based on which the countermeasure is selected in the symptom database 111 is not satisfied anymore. It can be also determined by storing conditions to determine whether the symptom is solved with respect to each countermeasure in the countermeasure database 112 in advance, and verifying whether the condition is satisfied.

Figure 6:
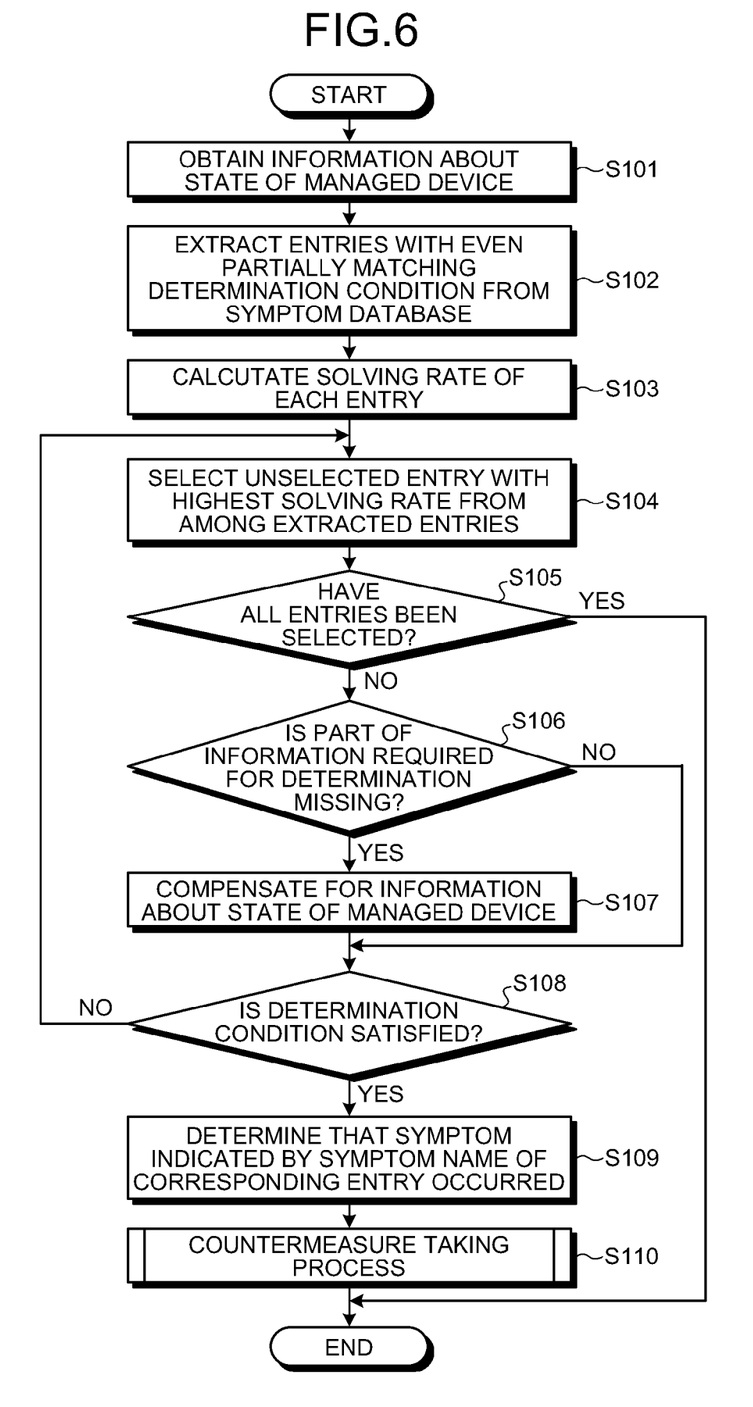
FIG. 6 is a flowchart of a processing procedure performed by the system management apparatus.

A processing procedure performed by the system management apparatus 100 illustrated in FIG. 2 is explained below. FIG. 6 is a flowchart of a processing procedure performed by the system management apparatus 100. FIG. 6 illustrates the processing procedure after the system management apparatus 100 receives the notify event from the managed device.

As illustrated in FIG. 6, when the information obtaining unit 121 obtains the information about the state of the managed device from the received notify event (Step S101), the symptom identifying unit 122 extracts entries of which determination condition even partially matches the information from the symptom database 111 (Step S102), and calculates the solving rate with respect to each entry (Step S103).

From among the extracted entries, one of unselected entries with the highest solving rate is selected (Step S104). If all the entries have been selected (YES at Step S105), it is determined that the managed device does not have any problem, and the process is terminated.

When an unselected entry can be selected (NO at Step S105), if a part of information required to determine whether the determination condition of the entry is satisfied is missing (YES at Step S106), the information compensating unit 125 compensates for the required information by actively obtaining the information about the state of the managed device (Step S107).

If it is verified that the determination condition is satisfied with the required information fully provided (YES at Step S108), the symptom identifying unit 122 determines that the symptom indicated by the symptom name of the entry occurs in the managed device (Step S109), and the system management apparatus 100 performs a countermeasure taking process to be described later (Step S110).

If it is verified that the determination condition is not satisfied with the required information fully provided (NO at Step S108), the symptom identifying unit 122 returns to Step S104 to perform the process on the next entry.

Figure 7:
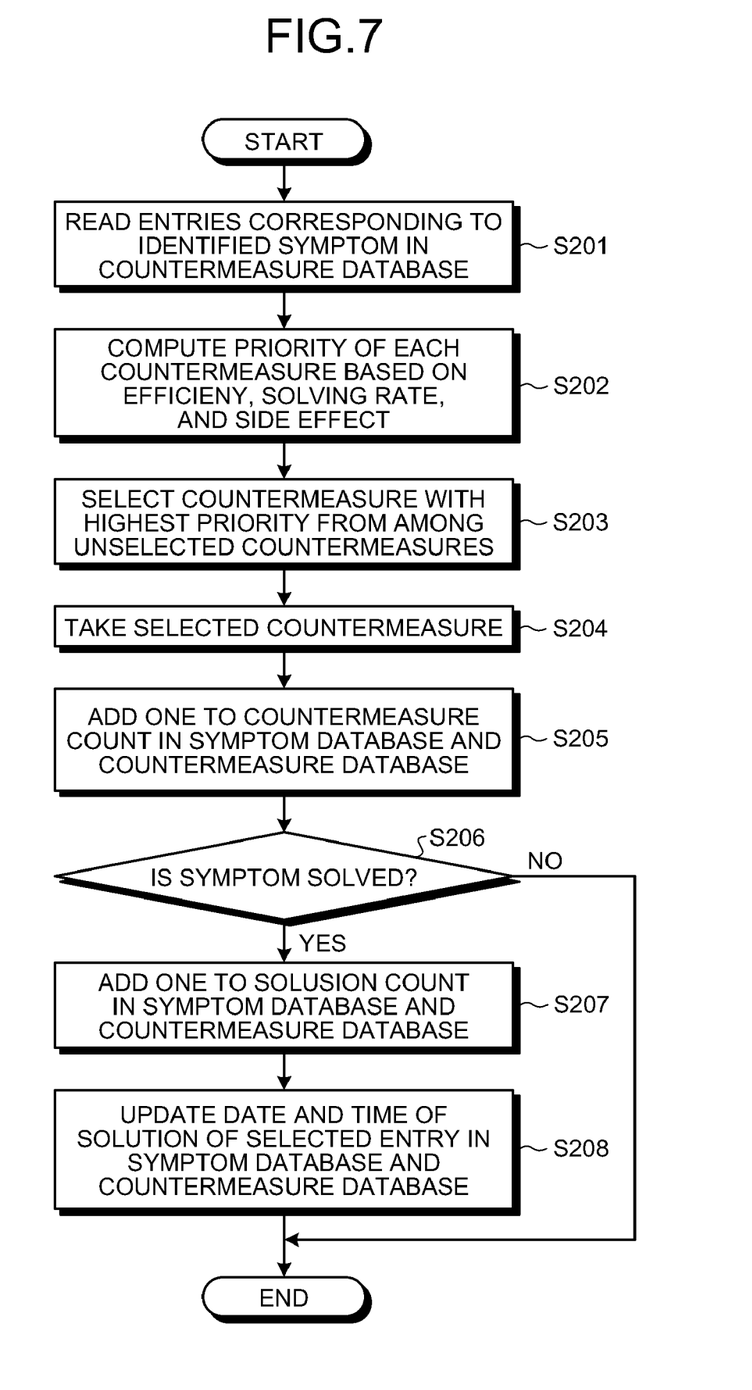
FIG. 7 is a flowchart of a processing procedure of a countermeasure-taking process.

FIG. 7 is a flowchart of a processing procedure of the countermeasure-taking process. As illustrated in FIG. 7, the countermeasure determining unit 123 reads entries corresponding to the symptom identified by the symptom identifying unit 122 in the countermeasure database 112 (Step S201), and calculates the priority of each countermeasure based on the efficiency, the solving rate, and the side effect (Step S202).

The countermeasure determining unit 123 selects a countermeasure with the highest priority from among the unselected countermeasures (Step S203), and has the countermeasure taking unit 124 take the countermeasure (Step S204).

The countermeasure-result evaluating unit 126 adds one to the countermeasure count of the entry in the symptom database 111 corresponding to the symptom identified at Step S109, and adds one to the solution count of the information in the countermeasure database 112 corresponding to the countermeasure selected at Step S203 (Step S205).

Furthermore, if it is determined that the symptom is solved by taking the countermeasure (YES at Step S206), one is added to the solution count of the information in the symptom database 111 and the countermeasure database 112 (Step S207), and the date and time of solution is updated to the date and time (Step S208).

A specific example of operation of the system management apparatus 100 is explained below assuming that the information obtaining unit 121 received the notify event illustrated in FIG. 5. The notify event illustrated in FIG. 5 indicates that the CPU utilization is 83% in a server of which host name is "server A".

To identify the symptom indicated by the information, the symptom identifying unit 122 reads the entries in the symptom database 111 and extracts the entries of which the determination condition matches even partially. As a result, entries with the entry numbers "A002" and "A003" having the determination condition of "CPU utilization>70%" are extracted.

To increase possibility of selecting an effective countermeasure, the symptom identifying unit 122 calculates the solving rate of the extracted entries. Based on the computation using Equation 1, the solving rate of the entry "A002" is about 75%, and the solving rate of the entry "A003" is about 80%.

The symptom identifying unit 122 selects the entry "A003" with a higher solving rate first, and has the information compensating unit 125 obtain missing information to verify whether the entire determination condition of the entry is satisfied. In this case, a memory utilization of the server with the host name of "server A" is obtained.

For example, if the obtained memory utilization is 90%, the determination condition of the entry "A003" is fully satisfied, and the symptom identifying unit 122 determines that the symptom corresponding to the symptom name of "high burden" occurs in the server with the host name of "server A".

After the symptom is identified as described above, the countermeasure determining unit 123 determines the countermeasure with reference to the countermeasure database 112. The entry of the symptom name of "high burden" in the example of the countermeasure database 112 illustrated in FIG. 4 includes two countermeasures.

Based on the computation using Equation 2, because the priority of the countermeasure "add server" is about 4.1, and the priority of the countermeasure "limit transactions" is about 3.8, the countermeasure determining unit 123 selects the countermeasure "add server" with higher priority as the countermeasure.

If both the countermeasure count and the solution count are zero, the priority of the countermeasure "add server" is five and the countermeasure "limit transactions" is six. In other words, in this case, although the priority of the countermeasure "limit transactions" is set at an inappropriately high value, as a result of repeating the countermeasures and repeating feedback of the result of the countermeasures, the priority of the countermeasure "add server" became more highly evaluated.

After the countermeasure is determined in this manner, the countermeasure taking unit 124 takes the countermeasure, and the countermeasure-result evaluating unit 126 evaluates the result to update the symptom database 111 and the countermeasure database 112.

The configuration of the system management apparatus 100 according to the embodiment illustrated in FIG. 2 can be modified in various ways within the scope of the present invention. For example, the system management apparatus 100 can be implemented as software. In other words, a computer program (hereinafter, "system management program") can be executed on a computer to realize the same function as the control unit 120 of the system management apparatus 100. Described below is an example of such a computer that executes a system management program 1071.

Figure 8:
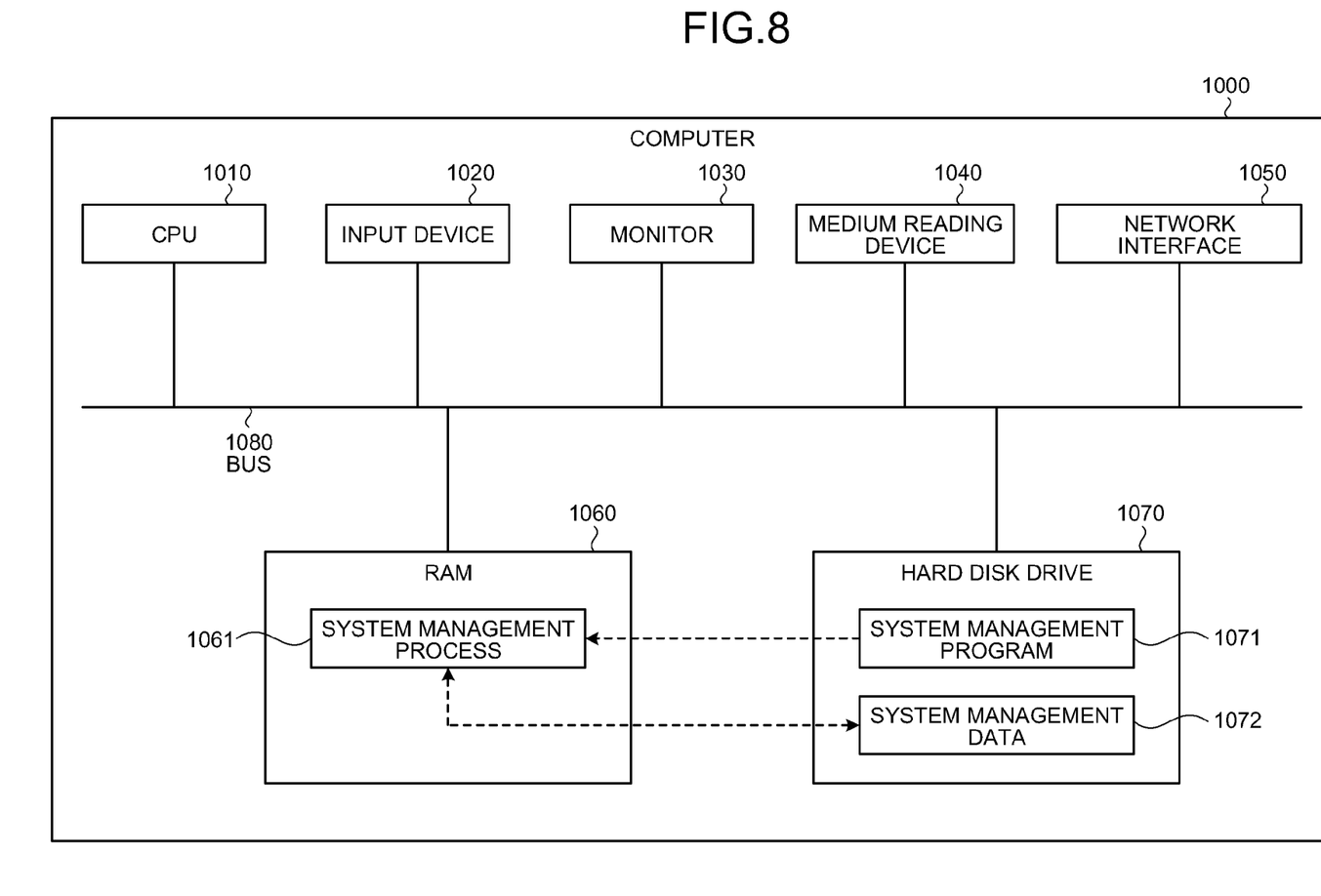
FIG. 8 is a block diagram of a computer that executes a system management program.

FIG. 8 is a block diagram of a computer 1000 that executes the system management program 1071. The computer 1000 includes a CPU 1010 that executes various types of arithmetic processing, an input device 1020 that receives data input by a user, a monitor 1030 that displays various information, a medium reading device 1040 that reads programs and the like from a recording medium, a network interface 1050 that sends data to and receives data from other computers via a network, a RAM (Random Access Memory) 1060 that temporarily stores therein various information, and a hard disk drive 1070, connected to one another with a bus 1080.

The hard disk drive 1070 stores therein the system management program 1071 having the same function as that of the control unit 120 illustrated in FIG. 2, and a system management data 1072 corresponding to various databases stored in the storage unit 110 illustrated in FIG. 2. Alternatively, the system management data 1072 can be separated as needed and stored in another computer connected with the network.

By the CPU 1010 loading the system management program 1071 from the hard disk drive 1070 into the RAM 1060, the system management program 1071 comes into operation as a system management process 1061. In the system management process 1061, the information read from the system management data 1072 is loaded into an area allocated to it in the RAM 1060 as needed, and various types of data processing is performed based on the data and the like.

The system management program 1071 need not necessarily be stored in the hard disk drive 1070.

Alternatively, the system management program 1071 may be stored in a recording medium, such as a CD-ROM, and read and executed by the computer 1000. The program may also be stored in another computer (or server) connected to the computer 1000 via a public line, the internet, a LAN (Local Area Network), a WAN (Wide Area Network), or the like, so that the computer 1000 reads and executes the program therefrom.

Although the value of the efficiency of each countermeasure is corrected based on the result of the countermeasure in the example described in the above embodiment, the size of the solving rate can be used as the priority to select the countermeasure. In this case, there is no need of setting the priority and the side effect, thereby reducing the burden on the system administrator. Otherwise, only the item of the side effect can be deleted from the countermeasure database 112 so that the multiplication of the efficiency and the solving rate is used as the priority to select the countermeasure.

Although the value of the efficiency of each countermeasure is corrected based on the result of the countermeasure in the example of the above embodiment, the value of the side effect of each countermeasure can be also correct based on the result of the countermeasure. Correction of the side effect can be performed by, for example, storing a specific phenomenon of the side effect associated with each countermeasure, recording whether the phenomenon still occurs after taking the countermeasure like the solution count, and multiplying occurring rate of the side effect calculated from the stored count and the countermeasure count by the value of the side effect.

The countermeasure can be determined based on the date and time of solution instead of the efficiency and the like, or in addition to them. When the date and time of solution is recent, it means that the countermeasure is effective in a relatively new environment. Therefore, it is likely that preferentially selecting the countermeasure with a more recent date and time of solution leads to selecting a countermeasure effective to the current symptom. Similarly, if a plurality of symptoms are matching when checking the information obtained by the information obtaining unit 121 against the symptom database 111, it can be determined that the symptom with the most recent date and time of solution occurred in anticipation of selecting an effective countermeasure.

As set forth hereinabove, according to an embodiment, the countermeasure database reflects whether the symptom of the managed device is solved after taking the countermeasure and, when the device needs some countermeasure next time, the countermeasure is selected based on the countermeasure database that reflects the result. Thus, the criterion for selecting the countermeasure can be automatically optimized.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A computer-readable, non-transitory medium storing therein a computer program that causes a computer to perform:

obtaining information indicative of a state a managed device;

identifying rhea symptom of the managed device by checking the information obtained by the obtaining against a symptom database, which includes a state of the managed device and the symptom of the managed device specified by the state associated with each other;

determining a countermeasure to solve the symptom of the managed device by checking the symptom identified by the identifying against a countermeasure database, which includes information related to determination of the countermeasure with respect to each symptom;

taking the countermeasure determined by the determining;

evaluating whether the countermeasure taken at the taking has solved the symptom; and updating the countermeasure database based on an evaluation result, wherein the updating includes storing a number of times the countermeasure has been taken and a number of times the symptom of the managed device has been solved by taking the countermeasure in the countermeasure database with respect to each countermeasure based on the evaluation result of the countermeasure taken at the taking, and the determining includes calculating, when the countermeasure database includes a plurality of countermeasures to solve the symptom identified at the identifying, a rate at which the symptom has been solved by taking each of the countermeasures, wherein a countermeasure with a higher rate is determined as the countermeasure to be taken.

2. The computer-readable, non-transitory medium according to claim 1, wherein the determining includes calculating, when the countermeasure database includes a plurality of countermeasures corresponding to the symptom identified at the identifying, a rate at which the symptom has been solved by taking each of the countermeasures, and determining a countermeasure with a highest rate as the countermeasure to be taken.

3. The computer-readable, non-transitory medium according to claim 1, wherein the evaluating includes storing a number of times the countermeasure has been taken and a number of times the symptom of the managed device has been solved by taking the countermeasure in the countermeasure database with respect to each countermeasure based on the evaluation result of the countermeasure taken at the taking, and the determining includes calculating, when the countermeasure database includes a plurality of countermeasures corresponding to the symptom identified at the identifying, a rate at which the symptom has been solved by taking each of the countermeasures, and determining, as the countermeasure to be taken, a countermeasure with a highest value obtained by multiplying efficiency stored in the countermeasure database in advance with respect to each countermeasure by the rate.

4. The computer-readable, non-transitory medium according to claim 1, wherein the evaluating includes storing a number of times the countermeasure has been taken and a number of times the symptom of the managed device has been solved by taking the countermeasure in the countermeasure database with respect to each countermeasure based on the evaluation result of the countermeasure taken at the taking, and the determining includes calculating, when the countermeasure database includes a plurality of countermeasures corresponding to the symptom identified at the identifying, a rate at which the symptom has been solved by taking each of the countermeasures, and determining, as the countermeasure to be taken, a countermeasure with a highest value obtained by adding a product of multiplication of efficiency stored in the countermeasure database in advance with respect to each countermeasure by the rate to a value indicative of a level of side effect stored in the countermeasure database in advance with respect to each countermeasure.

5. The computer-readable, non-transitory medium according to claim 1, wherein the evaluating includes storing a number of times the countermeasure has been taken and a number of times the symptom of the managed device has been solved by taking the countermeasure in the countermeasure database with respect to each countermeasure based on the evaluation result of the countermeasure taken at the taking, further evaluating whether the countermeasure taken at the taking has caused a side effect stored in the countermeasure database in advance associated with the countermeasure, and storing a number of times the countermeasure has caused the side effect in the countermeasure database with respect to each countermeasure, and the determining includes calculating, when the countermeasure database includes a plurality of countermeasures corresponding to the symptom identified at the identifying, a primary rate at which the symptom has been solved by taking each of the countermeasures and a secondary rate at which the side effect associated with the countermeasure has occurred, and determining, as the countermeasure to be taken, a countermeasure with a highest value obtained by adding a product of multiplication of efficiency stored in the countermeasure database in advance with respect to each countermeasure by the primary rate to a product of multiplication of a value indicative of a level of side effect stored in the countermeasure database in advance with respect to each countermeasure by the secondary rate.

6. The computer-readable, non-transitory medium according to claim 1, wherein the evaluating includes storing, when the symptom of the managed device is solved by the countermeasure taken at the taking, date and time at which the symptom is solved in the countermeasure database associated with the countermeasure, and the determining includes obtaining, when the countermeasure database includes a plurality of countermeasures corresponding to the symptom identified at the identifying, the date and time stored in the countermeasure database associated with each of the countermeasures, and determining the countermeasure with a most recent date and time as the countermeasure to be taken.

7. The computer-readable, non-transitory medium according to claim 1, wherein the evaluating includes storing a number of times the countermeasure has been taken and a number of times the symptom of the managed device has been solved by taking the countermeasure in the symptom database with respect to each symptom that is to be solved by the countermeasure based on the evaluation result of the countermeasure taken at the taking, and the identifying includes calculating a rate at which the symptom has been solved by taking the countermeasures based on information stored in the symptom database at the evaluating, and identifying the symptom occurring in the managed device in priority of a symptom with a high rate.

8. A system management apparatus comprising:
an information obtaining unit that obtains information indicative of a state of the managed device;
a symptom identifying unit that identifies the symptom of the managed device by checking the information obtained by the information obtaining unit against a symptom database, which includes the state of the managed device and the symptom of the managed device specified by the state associated with each other;
a countermeasure determining unit that determines a countermeasure to solve the symptom of the managed device by checking the symptom identified by the symptom identifying unit against a countermeasure database, which includes information related to determination of the countermeasure with respect to each symptom;
a countermeasure taking unit that takes the countermeasure determined by the countermeasure determining unit; and
a countermeasure-result evaluating unit that evaluates whether the countermeasure taken by the countermeasure taking unit has solved the symptom, and updates the countermeasure database based on an evaluation result, wherein
the countermeasure-result evaluating unit stores a number of times the countermeasure has been taken and a number of times the symptom of the managed device has been solved by taking the countermeasure in the countermeasure database with respect to each countermeasure based on the evaluation result of the countermeasure taken by the countermeasure taking unit, and
the countermeasure determining unit calculates, when the countermeasure I database includes a plurality of countermeasures to solve the symptom identified by the symptom identifying unit, a rate at which the symptom has been solved by taking each of the countermeasures and
a countermeasure with a higher rate is determined as the countermeasure to be taken.

9. The system management apparatus according to claim 8, wherein,
when the countermeasure database includes a plurality of countermeasures corresponding to the symptom identified by the symptom identifying unit, the countermeasure determining unit calculates a rate at which the symptom has been solved by taking each of the countermeasures, and determines a countermeasure with a highest rate as the countermeasure to be taken.

10. The system management apparatus according to claim 8, wherein
the countermeasure-result evaluating unit stores a number of times the countermeasure has been taken and a number of times the symptom of the managed device has been solved by taking the countermeasure in the countermeasure database with respect to each countermeasure based on the evaluation result of the countermeasure taken by the countermeasure taking unit, and
when the countermeasure database includes a plurality of countermeasures corresponding to the symptom identified by the symptom identifying unit, the countermeasure determining unit calculates a rate at which the symptom has been solved by taking each of the countermeasures, and determines, as the countermeasure to be taken, a countermeasure with a highest value obtained by multiplying efficiency stored in the countermeasure database in advance with respect to each countermeasure by the rate.

11. The system management apparatus according to claim 8, wherein
the countermeasure-result evaluating unit stores a number of times the countermeasure has been taken and a number of times the symptom of the managed device has been solved by taking the countermeasure in the countermeasure database with respect to each countermeasure based on the evaluation result of the countermeasure taken by the countermeasure taking unit, and
when the countermeasure database includes a plurality of countermeasures corresponding to the symptom identified by the symptom identifying unit, the countermeasure determining unit calculates a rate at which the symptom has been solved by taking each of the countermeasures, and determines, as the countermeasure to be taken, a countermeasure with a highest value obtained by adding a product of multiplication of efficiency stored in the countermeasure database in advance with respect to each countermeasure by the rate to a value indicative of a level of side effect stored in the countermeasure database in advance with respect to each countermeasure.

12. The system management apparatus according to claim 8, wherein
the countermeasure-result evaluating unit stores a number of times the countermeasure has been taken and a number of times the symptom of the managed device has been solved by taking the countermeasure in the countermeasure database with respect to each countermeasure based on the evaluation result of the countermeasure taken by the countermeasure taking unit, further evaluates whether the countermeasure taken by the countermeasure taking unit has caused a side effect stored in the countermeasure database in advance associated with the countermeasure, and stores a number of times the countermeasure has caused the side effect in the countermeasure database with respect to each countermeasure, and
when the countermeasure database includes a plurality of countermeasures corresponding to the symptom identified by the symptom identifying unit, the countermeasure determining unit calculates a primary rate at which the symptom has been solved by taking each of the countermeasures and a secondary rate at which the side effect associated with the countermeasure has occurred, and determines, as the countermeasure to be taken, a countermeasure with a highest value obtained by adding a product of multiplication of efficiency stored in the countermeasure database in advance with respect to each countermeasure by the primary rate to a product of multiplication of a value indicative of a level of side effect stored in the countermeasure database in advance with respect to each countermeasure by the secondary rate.

13. The system management apparatus according to claim 8, wherein
when the symptom of the managed device is solved by the countermeasure taken by the countermeasure taking unit, the countermeasure-result evaluating unit stores date and time at which the symptom is solved in the countermeasure database associated with the countermeasure, and
when the countermeasure database includes a plurality of countermeasures corresponding to the symptom identified by the symptom identifying unit, the countermeasure determining unit obtains the date and time stored in the countermeasure database associated with each of the countermeasures, and determines the countermeasure with a most recent date and time as the countermeasure to be taken.

14. The system management apparatus according to claim 8, wherein
the countermeasure-result evaluating unit stores a number of times the countermeasure has been taken and a number of times the symptom of the managed device has been solved by taking the countermeasure in the symptom database with respect to each symptom that is to be solved by the countermeasure based on the evaluation result of the countermeasure taken by the countermeasure taking unit, and
the symptom identifying unit calculates a rate at which the symptom has been solved by taking the countermeasures based on information stored in the symptom database by the countermeasure-result evaluating unit, and identifies the symptom occurring in the managed device in priority of a symptom with a high rate.

15. A system management method for identifying a symptom of a problem occurring in a managed device, determining a countermeasure to solve the symptom, and taking the countermeasure, the system management method comprising:
obtaining information indicative of a state of the managed device;
identifying the symptom of the managed device by checking the information obtained the obtaining against a symptom database, which includes the state of the managed device and the symptom of the managed device specified by the state associated with each other;
determining a countermeasure to solve the symptom of the managed device by checking the symptom identified by the identifying against a countermeasure database, which includes information related to determination of the countermeasure with respect to each symptom;
taking the countermeasure determined by the determining;
evaluating whether the countermeasure taken at the taking has solved the symptom; and
updating the countermeasure database based on an evaluation result, wherein the updating includes storing a number of times the countermeasure has been taken and a number of times the symptom of the managed device has been solved by taking the countermeasure in the countermeasure database with respect to each countermeasure based on the evaluation result of the countermeasure taken at the taking, and
the determining includes calculating, when the countermeasure database I includes a plurality of countermeasures to solve the symptom identified at the identifying, a rate at which the symptom has been solved by taking each of the countermeasures and
a countermeasure with a higher value is determined as the countermeasure to be taken.

16. The system management method according to claim 15, wherein,
the determining includes calculating, when the countermeasure database includes a plurality of countermeasures corresponding to the symptom identified at the identifying, a rate at which the symptom has been solved by taking each of the countermeasures, and determining a countermeasure with a highest rate as the countermeasure to be taken.

17. The system management method according to claim 15, wherein
the evaluating includes storing a number of times the countermeasure has been taken and a number of times the symptom of the managed device has been solved by taking the countermeasure in the countermeasure database with respect to each countermeasure based on the evaluation result of the countermeasure taken at the taking, and
the determining includes calculating, when the countermeasure database includes a plurality of countermeasures corresponding to the symptom identified at the identifying, a rate at which the symptom has been solved by taking each of the countermeasures, and determining, as the countermeasure to be taken, a countermeasure with a highest value obtained by multiplying efficiency stored in the countermeasure database in advance with respect to each countermeasure by the rate.

18. The system management method according to claim 15, wherein
the evaluating includes storing a number of times the countermeasure has been taken and a number of times the symptom of the managed device has been solved by taking the countermeasure in the countermeasure database with respect to each countermeasure based on the evaluation result of the countermeasure taken at the taking, and
the determining includes calculating, when the countermeasure database includes a plurality of countermeasures corresponding to the symptom identified at the identifying, a rate at which the symptom has been solved by taking each of the countermeasures, and determining, as the countermeasure to be taken, a countermeasure with a highest value obtained by adding a product of multiplication of efficiency stored in the countermeasure database in advance with respect to each countermeasure by the rate to a value indicative of a level of side effect stored in the countermeasure database in advance with respect to each countermeasure.

19. The system management method according to claim 15, wherein
the evaluating includes storing a number of times the countermeasure has been taken and a number of times the symptom of the managed device has been solved by taking the countermeasure in the countermeasure database with respect to each countermeasure based on the evaluation result of the countermeasure taken at the taking, further evaluating whether the countermeasure taken at the taking has caused a side effect stored in the countermeasure database in advance associated with the countermeasure, and storing a number of times the countermeasure has caused the side effect in the countermeasure database with respect to each countermeasure, and
the determining includes calculating, when the countermeasure database includes a plurality of countermeasures corresponding to the symptom identified at the identifying, a primary rate at which the symptom has been solved by taking each of the countermeasures and a secondary rate at which the side effect associated with the countermeasure has occurred, and determining, as the countermeasure to be taken, a countermeasure with a highest value obtained by adding a product of multiplication of efficiency stored in the countermeasure database in advance with respect to each countermeasure by the primary rate to a product of multiplication of a value indicative of a level of side effect stored in the countermeasure database in advance with respect to each countermeasure by the secondary rate.

20. The system management method according to claim 15, wherein
the evaluating includes storing, when the symptom of the managed device is solved by the countermeasure taken at the taking, date and time at which the symptom is solved in the countermeasure database associated with the countermeasure, and the determining includes obtaining, when the countermeasure database includes a plurality of countermeasures corresponding to the symptom identified at the identifying, the date and time stored in the countermeasure database associated with each of the countermeasures, and determining the countermeasure with a most recent date and time as the countermeasure to be taken.

21. The system management method according to claim 15, wherein the evaluating includes storing a number of times the countermeasure has been taken and a number of times the symptom of the managed device has been solved by taking the countermeasure in the symptom database with respect to each symptom that is to be solved by the countermeasure based on the evaluation result of the countermeasure taken at the taking, and the identifying includes calculating a rate at which the symptom has been solved by taking the countermeasures based on information stored in the symptom database at the evaluating, and identifying the symptom occurring in the managed device in priority of a symptom with a high rate.

* * * * *

UNITED STATES PATENT AND TRADEMARK OFFICE
CERTIFICATE OF CORRECTION

PATENT NO. : 8,145,449 B2
APPLICATION NO. : 12/359898
DATED : March 27, 2012
INVENTOR(S) : Shimada et al.

It is certified that error appears in the above-identified patent and that said Letters Patent is hereby corrected as shown below:

In the Claims

Col. 10, line 66, In claim 1:   Delete "rhea" and insert --a-- in its place.

Col. 13, line 33, In claim 8:   Delete "I database" and insert --database-- in its place.

Col. 15, line 48, In claim 15:  Delete "database I" and insert --database-- in its place.

Signed and Sealed this
Twenty-seventh Day of November, 2012

David J. Kappos
*Director of the United States Patent and Trademark Office*